Dec. 13, 1966   J. BILLEN   3,291,387
CONTINUOUS CENTRIFUGAL SEPARATOR
Filed Jan. 16, 1964   2 Sheets-Sheet 2
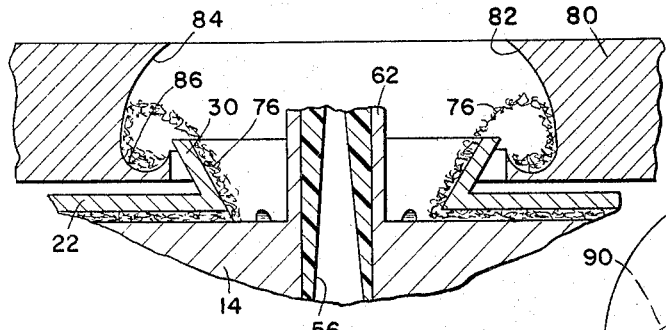
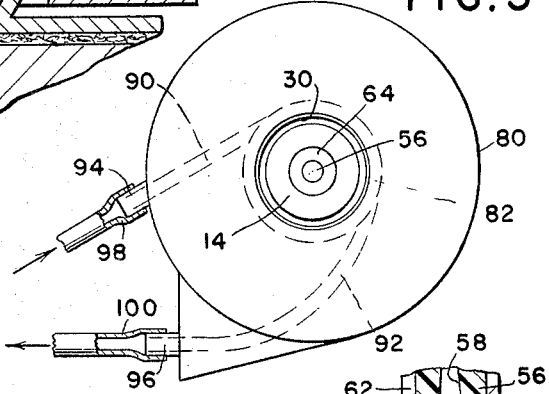
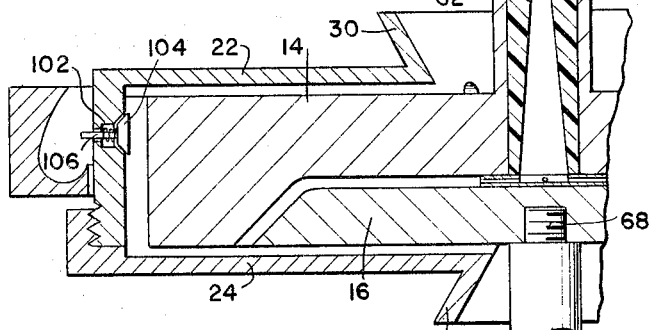
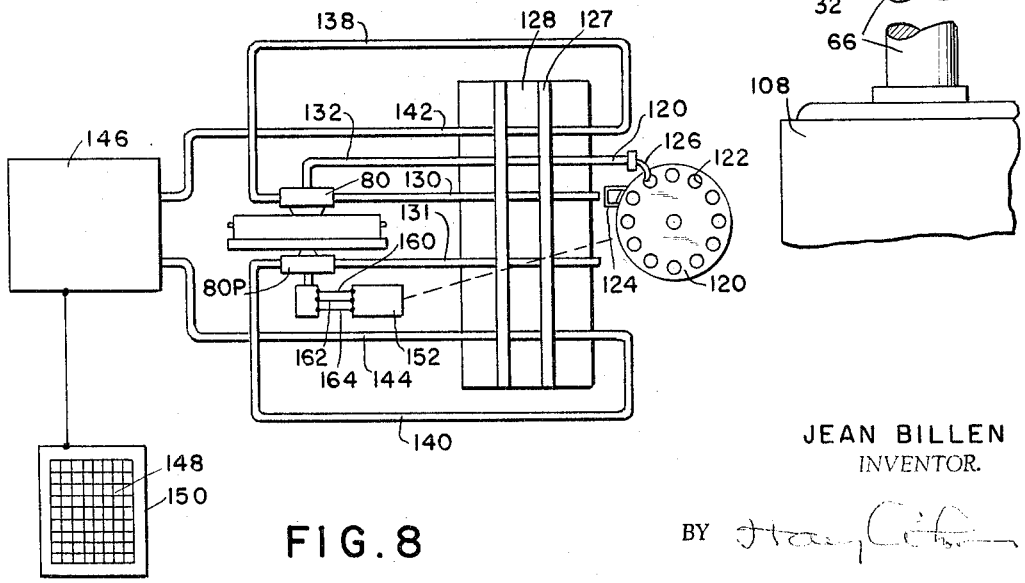
JEAN BILLEN
INVENTOR.
BY 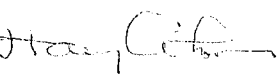
ATTORNEY

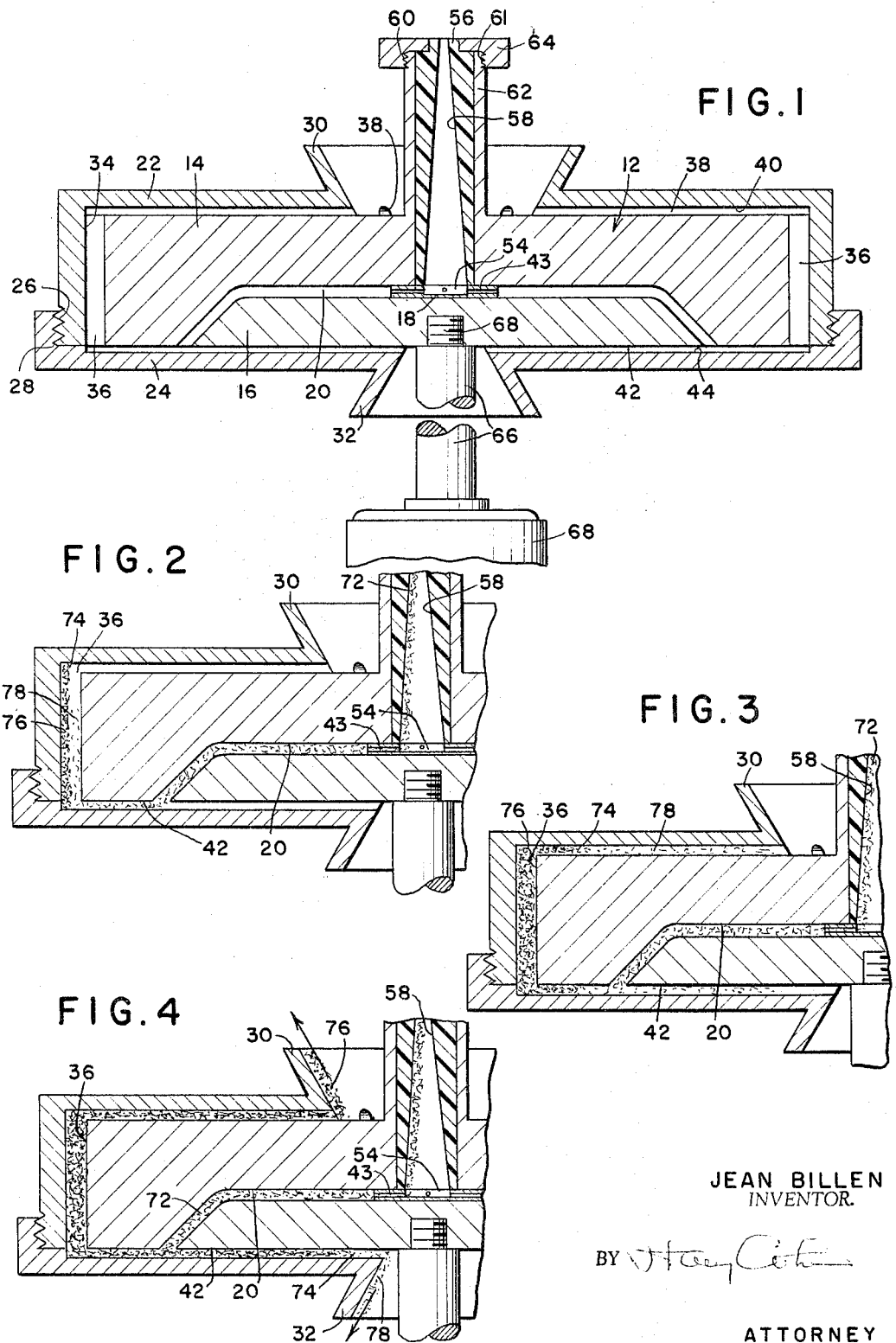

United States Patent Office 3,291,387
Patented Dec. 13, 1966

3,291,387
CONTINUOUS CENTRIFUGAL SEPARATOR
Jean Billen, Brabant, Belgium, assignor to Technicon Instruments Corporation, Chauncey, N.Y., a corporation of New York
Filed Jan. 16, 1964, Ser. No. 338,157
8 Claims. (Cl. 233—28)

This invention relates to apparatus for the continuous centrifugal separation of materials.

An object of the invention is the provision of continuous centrifugal separation apparatus particularly, but not exclusively, adapted to the substantially complete separation and collection of the lighter and heavier constituents of liquid or semi-liquid mixtures which comprise such constituents.

Another object of the invention is the provision of continuous centrifugal separation apparatus particularly, but not exclusively, adapted to the substantially complete separation and collection of the red cells and plasma contained in whole blood, the substantially complete separation and collection of animal or microbial cells from a culture media in which the same may be carried, and/or the substantially complete separation and collection of solids such as crystals or precipitates from the liquid carriers thereof.

A further object of the invention is the provision of apparatus as above particularly, but not exclusively, adapted to incorporation in continuous, automatic chemical analysis apparatus of the nature disclosed in the copending U.S. application, Serial No. 234,308, of Leonard T. Skeggs et al. filed October 31, 1962, now Patent 3,241,432, issued March 22, 1966 and assigned to the assignee hereof, and related U.S. applications and patents referred to therein.

Another object of the invention is the provision of apparatus as above of generally improved design and construction which embody decreased cost and complexity and improved operational results.

The above and other objects and advantages of my invention are believed made clear by reference hereinbelow to the accompanying detailed drawings wherein:

FIG. 1 is a vertical sectional view taken through the center of the separator apparatus;

FIGS. 2, 3 and 4 are views similar to FIG. 1, with portions omitted, depicting the separator apparatus at various stages during the operation thereof;

FIG. 5 is a vertical sectional view similar to FIG. 1, with portions omitted, depicting the collector means of the separator apparatus operatively associated therewith;

FIG. 6 is a top plan view, with parts in section for purposes of illustration, of the collector means of the separator apparatus;

FIG. 7 is a view similar to FIG. 1, with portions omitted, of a second embodiment of the separator apparatus; and FIG. 8 is a diagrammatic view of the separator apparatus utilized in conjunction with automatic, chemical analysis apparatus of the nature referred to hereinabove.

Referring now to FIG. 1, a two piece rotor is generally indicated at 12 and comprises complementary shaped, generally circular portions 14 and 16 relatively positioned as shown by spacer element 18 to form an annular space 20 therebetween. Generally circular closure members 22 and 24, respectively, include complementary threaded portions at 26 and 28, and are positioned as shown in surface contact with the said rotor portions whereby the said closure members may be tightly attached to each other at the said threaded portions thereof to in turn securely clamp the rotor portions 14 and 16 and spacer element 18 therebetween to form a functionally integral rotor assembly. An integral, cylindrical portion 62 projects as shown from rotor portion 14 and includes threads 61 formed thereon.

The closure members 22 and 24 include generally funnel-shaped outlet portions 30 and 32, respectively, projecting therefrom for purposes described in detail hereinbelow. Rotor portion 14 will be seen to terminate short of the adjacent interior wall surface 34 of closure member 22 whereby an annular space 36 of 360° extent is formed therebetween.

An array of radially extending grooves 38 is formed in interior wall 40 of closure member 22 and extend therein from the funnel-shaped outlet portion 30 into communication with annular space 36. A similar array of radially extending grooves 42 is formed in interior wall 44 of closure member 24 and also extend therein from funnel-shaped outlet portion 32 into communication with annular space 36. In addition, grooves 42 will be seen at an intermediate portion thereof to extend into communication with the space 20 formed between the respective rotor portions. The grooves 38 and 42 may, for example, be of eight each in number and of generally equal annular spacing in the interior walls 40 and 44 of the respective closure members 22 and 24.

An array of radially extending passages 43 which may, for example, also be of eight in number are formed in the spacer element 18 and extend therethrough from the hollow, central portion 54 thereof into communication with the annular space 20.

An inlet tube 56, preferably but not necessarily of a natural anti-function material such as Teflon, extends as shown by a tight fit into aligned bores provided therefor in rotor portions 62 and 14, respectively, and includes a tapered inlet bore 58 formed therein which in turn extends into communication with the hollow central portion 54 of the spacer element 18. The said inlet tube is maintained in the depicted position thereof by threaded attachment element 64 positioned thereover as shown with the threads 60 thereof cooperatively associated with threads 61 of cylindrical rotor portion 62.

A drive shaft 66, including threaded portion 68, is tightly affixed to rotor portion 16 by engagement of the said threaded portion with a complementary threaded hole formed in the said rotor portion. The said drive shaft is rotatably driven in any convenient manner, as for example by an electric motor 68 attached thereto, to in turn effect the driven, high speed rotation of the separator apparatus. It is to be understood that the structure depicted in FIG. 1 constitutes a functionally integral unit whereby driven rotation of the said drive shaft will result in correspondingly driven rotation of the entire unit.

The manner of operation of the separator apparatus of my invention will now be described in detail with reference to FIGS. 2 and 3, in conjunction with the separation of whole blood into the heavier red blood cell and lighter plasma constituents thereof. It is to be understood, however, that the separation of blood is intended as exemplary, only, and that the separator apparatus herein is applicable to the separation of many other liquid or semi-liquid materials which comprise heavier and lighter constituents. The separator apparatus would, for example, be used for the separation of blood in applications wherein the said apparatus were incorporated in continuous automatic chemical analysis apparatus of the nature disclosed in the said copending U.S. application, Serial No. 234,308, in the automatic determination of various blood chemistries which require the use of plasma or serum as opposed to whole blood in in vivo techniques for physiological studies.

In operation, the separator apparatus of FIGS. 1–4 is driven at high rotational speed, as for example 10,000 or more r.p.m., through drive shaft 66. A sample of whole blood, identified as 72 in FIGS. 2, 3 and 4, is introduced to the apparatus through tapered inlet bore 58, as for example by a hypodermic needle operatively positioned therewithin for friction reduction purposes. Due to the tapered shape of the said bore, the blood will be moved by the effect of the considerable centrifugal force generated at the above mentioned high rotational speed of the separator, downwardly as seen in FIGS. 1–4 into the hollow central portion 54 of spacer element 18, and therefrom through the radially extending passages 43 formed therein, into annular space 20. The continuing effect of centrifugal force on the blood will effect the movement therefrom from the said annular space into and through grooves 42 to annular space 36. As the blood reaches the said annular space, a separation line 74 between the heavier red blood cell and lighter plasma constituents thereof, identified as 76 and 78, respectively, will commence to be formed therein with the former accumulating in the radially outward portion of the said space and the latter in the radially inward portion thereof, whereupon the operational condition of the separator at this point will be as depicted in FIG. 2.

Continued high speed rotation of the separator and introduction of the whole blood sample 72 thereto through inlet bore 58, will result in the radially inward progression of the separation line 74 as indicated by the position thereof depicted in FIG. 3. This is of course due to the continuing effect of the considerable centrifugal force on the blood, the build up of the heavier red blood cells in the radially outward portions of the respective grooves and annular space, and the fact that the volume of whole blood supplied to the separator now exceeds the volume of annular space 36.

Further supply of the whole blood sample 72 to the separator will ultimately result in the separation line 74 assuming the position thereof depicted in FIG. 4 wherein it has reached outlet 30, whereupon the red blood cells 76 will commence to be discharged through funnel shaped outlet portion 30 due to the tapered shape thereof and the effect of centrifugal force thereon, and the plasma 78 similarly discharged through funnel-shaped outlet portion 32. At this point the separator apparatus of this invention has assumed what may be termed the "steady state" operational condition thereof whereby further supply of the blood sample thereto through inlet bore 58 will result in the substantially complete separation thereof into red blood cells and plasma and the corresponding discharge of the former from outlet portion 30 and the latter from outlet portion 32.

It may be noted that the relatively small amount of plasma 78 located in groove 38 radially inward of the separation line 74 as seen in FIG. 3 will, of necessity, be discharged through outlet 30 prior to the commencement of the desired discharge of the red blood cells 76 therefrom. Such discharge of a small quantity of plasma from the red blood cell outlet presents no significant problem, however, in that the extremely larger quantity of red blood cells discharged therefrom immediately thereafter will substantially negate any effect that the said small quantity of plasma might have on chemical analysis of the said red blood cells. Alternatively, the said small quantity of plasma could be collected and discarded.

Collection of the separated cells 76 and plasma 78 at the respective outlet portions 30 and 32 thereof may be effected in any convenient manner, as for example that depicted in FIGS. 5 and 6. As seen therein in conjunction with the cell outlet portion 30, a stationary annular collector element 80, comprising a generally circularly-shaped groove 82 formed therein, is positioned as shown relative to the said cell outlet. Thus may be appreciated whereby the red blood cells 76 discharged from the separator outlet portion 30 under the influence of the considerable centrifugal force in the manner described in detail hereinabove, will move at high speed radially outwardly therefrom as indicated to strike and collect on surface portion 84 of groove 82 and flow therefrom under the force of gravity to collect within surface portion 86 of the said groove.

Removal of the separated cells from the groove 82 for supply thereof, for example, to automatic blood sample analysis apparatus of the nature disclosed in the said copending U.S. application, Serial No. 234,308, may be conveniently effected in the manner depicted in FIG. 5 wherein inlet and outlet passages 90 and 92, respectively, may be seen to be formed in the collector element and to extend therethrough into fluid flow communication with the groove 82. Nipples 94 and 96 are affixed in any convenient manner to the collector element and are in fluid flow communication with the respective inlet and outlet passages whereby, through the convenient and readily removable fluid flow attachment of the plastic tubes 98 and 100 of the said automatic analysis apparatus to the said nipples, the said groove 82 may be placed in fluid flow communication therewith for supply of the separated blood cells thereto. This supply may be effected, for example, by the supply of a suitable cell carrier liquid, such as a salt water solution, through tube 98 whereby the said solution will flow through nipple 94 and passage 90 to and around the groove 82, to collect the blood cells therewithin and carry the same therefrom through passage 92, nipple 96 and tube 100 for supply to the said automatic analysis apparatus. Collection of the plasma may be effected in a non-illustrated but substantially identical structural manner at plasma outlet portion 32, and the use of a carrier liquid such as plain, rather than salt, water.

FIG. 7 depicts a preferred, but not necessarily exclusive, structural arrangement whereby washing of the separator, e.g. removal of the residual blood cells and plasma remaining within the separator after the separation of a blood sample, before the introduction of another blood sample thereto to prevent contamination of the separated constituents of the latter by the residuals of the former, may be conveniently effected. In this respect, it is to be understood that provision for such washing would be particularly desirable in applications wherein the separator were used on a continuous basis in conjunction with automatic blood sample supply and analysis apparatus of the nature disclosed in the said copending U.S. application Serial No. 234,308. Since it is an inherent function of the said sample supply and analysis apparatus to provide a continuous stream of discrete blood samples spaced from each other by a slug of a suitable wash liquid, as for example water, no additional provision need be made in the separator apparatus for the supply of a slug of wash liquid following the supply of each blood sample thereto for centrifugal separation. This is to say that the supply of blood samples to the separator apparatus through inlet passage 58 would, in application wherein the separator were utilized on a continuous basis in conjunction with automatic blood sample supply and analysis apparatus of the nature referred to, normally include the supply of a slug of wash liquid following the supply of each blood sample thereto.

Referring now to FIGURE 7 wherein is depicted a preferred structural arrangement for effecting washing of the separator following the supply of each blood sample thereto, at least one stepped bore 102, shaped as shown, is formed in the peripheral wall of closure member 22. A complementary shaped poppet valve 104 is operatively positioned in the said bore in any convenient, well known manner, and spring biased therein by the action of compression spring 106 toward the open position thereof. The force constant of the said spring is predetermined to maintain the valve 104 in the open position thereof against the counteraction of centrifugal force due to rotation of the separator at a first rotational speed of the latter; and to be insufficient to maintain the said valve open against the counteraction of said centrifugal force at a second, and of course higher, rotational speed of the separator. Thus the said poppet valve will be open at what might be termed the "low" operational speed of the separator and closed at what might be termed the "high" operational speed thereof. To this effect, a two-speed drive motor 108 of any suitable, readily available form is utilized to drive the embodiment of the separator which includes structural provision for the washing thereof. Thus, in continuous applications wherein the fluid stream supplied to the separator through inlet passage 58 comprises alternating blood sample portions and slugs of wash liquid, selective and correspondingly alternating energization of two-speed motor 108 will enable the separator to be driven at the "high" operational speed thereof during the supply of each blood sample portion thereto. This will maintain poppet valve 104 tightly closed to in turn enable the separation of the blood into red blood cells and plasma, and the respective collection thereof, in the exact manners described hereinabove with reference to FIGS. 1–6. Conversely, the separator may be driven at the low operational speed thereof during the supply of the slug of wash liquid thereto to maintain poppet valve 104 in the open position, and in turn enable the concurrent flow of the preceding blood sample portion and the separated cell and plasma constituents thereof, remaining in the separator, and the slug of wash liquid now being supplied thereto, out of the separator through bore 102 under the effect of centrifugal force thereon. Thus is made possible the convenient and substantially complete cleansing of the separator prior to the introduction of the next succeeding blood sample thereto to prevent significant contamination thereof by the said remaining portion and separated constituents of the preceding blood sample.

Alternatively, and against the possibility that some slight portions of the separated red blood cell and plasma constituents might remain on the portions of the rotor adjacent the exits 30 and 32 after the hereinabove described wash cycle, the separator might be momentarily driven at the "high" operational speed thereof just prior to the end of the flow of wash liquid slug therethrough. This will of course result in a closing of the poppet valve 104 and the flow of the wash liquid through the separator and exit therefrom at both outlet portions 30 and 32 to wash the remaining slight constituent portions therefrom.

Referring now to FIG. 8, the separator is depicted therein in exemplary operative relationship with automatic blood sample supply and analysis apparatus of the nature disclosed in the said U.S. copending application, Serial No. 234,308. Briefly described, the said apparatus might comprise an indexible sample support plate 120 upon which are supported receptacles 122, each of which contains a discrete blood sample. A wash liquid reservoir is indicated at 124, and a blood sample pick-up and supply apparatus at 126, it being the function of the latter to aspirate, due to reduced pressure conditions maintained therein by rollers 127 of proportioning pump 128 and interconnected tube 120, alternating blood samples from receptacles 122 as the same are indexed into position adjacent thereto by sample support plate 120, and slugs of wash liquid from reservoir 124, for supply in a continuous stream to the said pump. From the pump, the said stream is transmitted via tube 132 for supply to the inlet 58 of the separator in the manner described hereinabove. Concurrently therewith, a suitable red cell carrier liquid is pumped by proportioning pump 128 from any suitable container thereof through tube 130 into non-illustrated groove 82 of red cell collector 80; and a suitable plasma carrier liquid similarly supplied to plasma collector 80p through tube 131. From the respective collector the said carrier liquids and respective blood sample cell and plasma constituents now contained therein, are returned via tubes 138 and 140 to the proportioning pump 128 for pumping thereby through tubes 142 and 144 to appropriate chemical treatment and analysis apparatus indicated diagrammatically at 146, wherein the said constituents may be automatically analyzed to determine, for example, the respective quantities of substances contained therein, and the results of such analyses formed as curves on the recording chart 148 of recorder 150.

Since the relative volumes of the blood samples and slugs of wash liquid supplied to the separator as a continuous stream via tube 132 are fixed by the operational timing of the indexible sample support plate 120 and pick up and supply device 126, provision may be made to operatively control the speed of the two-speed motor 108 therefrom whereby the said motor will be operated at "fast" speed during the supply of each blood sample to the separator, and at "slow" speed during the supply of each slug of wash liquid thereto. To this effect, the said motor includes three leads 160, 162 and 164, hereinafter referred to for convenience of description as the slow, common, and fast leads, respectively, in that the said motor will run at slow speed with an energization circuit completed across the said slow and common leads, and at fast speed with an energization circuit connected across the said fast and common leads. A control device 152 is operatively associated with the said sample support plate 120, as indicated by the dashed line extending therebetween, and is provided to control the operational speed of the said motor through the said leads 160, 162 and 164 interconnected therebetween, in precisely timed relation to the operation of the said indexible sample support plate and pick-up and supply device. The said control device may take any convenient and readily available form, as for example but not necessarily, that disclosed in the copending U.S. application of Milton H. Pelavin et al., Serial No. 298,762, filed July 30, 1963, now Patent 3,196,449, issued July 20, 1965 and assigned to the assignee hereof, for the control of a two speed recorder chart drive motor in precisely timed relation to the operation of a sample supply device. In this context, briefly described, the said control device would include a timing circuit comprising a timing cam driven at a speed precisely related to the operation of indexible sample support plate 120, a cam responsive switch, and a single pole double throw relay connected in series with said switch through the contacts of which relay the energization circuits for motor 108 are alternately completed across motor leads 160 and 162, and 164 and 162. Thus may be understood whereby the herein disclosed centrifugal separator is particularly adaptable, in accordance with a stated object thereof, to convenient incorporation in a continuous, automatic sample supply and analysis system.

Certain features of the separator apparatus disclosed but not claimed herein are disclosed and claimed in the copending U.S. application of Jack Isreeli, Serial No. 338,174, filed concurrently herewith, now abandoned, and assigned to the assignee hereof.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. A method of analysis of each of a plurality of samples for a constituent thereof comprising: transmitting the samples successively and in alternation with quantities of a wash liquid as a first flowing stream; centrifuging each of the successively transmitted samples in the flowing stream into a denser fraction and a less dense fraction; providing a stream of a carrier liquid to transport each of the successively produced denser fractions as a second flowing stream; and analyzing the second flowing stream for a constituent of interest.

2. Apparatus for the analysis of each of a plurality of samples for a constituent thereof comprising: centrifugal separating means having an inlet means for receiving samples to be separated, a first outlet receptacle means for receiving the denser fraction of a separated sample, and a second outlet means for passing the less dense fraction of such separated sample; sample and wash liquid supply means for transmitting the samples successively and in alternation with quantities of a wash liquid as a flowing stream to said inlet of said centrifugal separating means; analysis means; carrier liquid supply means for transmitting a flowing stream of a carrier liquid to said first outlet receptacle of said separating means and thence to said analysis means for transporting therewith any denser fraction of each such separated sample.

3. Apparatus according to claim 2, wherein said first outlet receptacle means includes a first outlet means which is radially inward of said separating chamber and is connected thereto by a first plurality of radial passageways which join said separating chamber at the upper end thereof; said second outlet means is disposed radially inward of said separating chamber and is connected thereto by a second plurality of radial passageways which join said separating chamber at the lower end thereof; and said inlet means is disposed radially inward of said separating chamber and is coupled thereto by an annular passageway which joins said second plurality of radial passageways intermediate said lower end of said separating chamber and said second outlet means.

4. Apparatus according to claim 3 wherein said first outlet receptacle means includes a receptacle which is stationary and said carrier liquid supply means is also stationary.

5. A method of analysis of each of a plurality of samples for a plurality of constituents thereof comprising: transmitting the samples successively and in alternation with quantities of a wash liquid as a flowing stream; centrifuging each of the successively transmitted samples in the flowing stream into a denser fraction and a less dense fraction; providing a first stream of a first carrier liquid to transport each of the successively produced denser fractions, and providing a second stream of a second carrier liquid to transport each of the successively produced less dense fractions, whereby said flowing stream of samples is divided into two quotient streams each containing a fraction of each sample in said flowing stream; and analyzing each of said quotient streams for a respective constituent of interest.

6. Apparatus for the analysis of each of a plurality of samples for a plurality of constituents thereof comprising: centrifugal separating means having an inlet for receiving samples to be separated, first outlet receptacle means for receiving the denser fraction of a separated sample, and a second outlet receptacle means for receiving the less dense fraction of such separated sample; sample and wash liquid supply means for transmitting the samples successively and in alternation with quantities of a wash liquid as a flowing stream to said inlet of said centrifugal separating means; analysis means; first carrier liquid supply means for transmitting a flowing stream of a first carrier liquid to said first outlet receptacle of said separating means and thence to said analysis means for transporting therewith any denser fraction of each such separated sample; second carrier liquid supply means for transmitting a flowing stream of a second carrier liquid to said second outlet receptacle of said separating means and thence to said analysis means for transporting therewith any less dense fraction of such separated sample.

7. Apparatus according to claim 6 wherein said first outlet receptacle means includes a first outlet means which is radially inward of said separating chamber and is connected thereto by a first plurality of radial passageways which join said separating chamber at the upper end thereof; said second outlet receptacle means includes a second outlet means which is disposed radially inward of said separating chamber and is connected thereto by a second plurality of radial passageways which join said separating chamber at the lower end thereof; and said inlet means is disposed radially inward of said separating chamber and is coupled thereto by an annular passageway which joins said second plurality of radial passageways intermediate said lower end of said separating chamber and said second outlet means.

8. Apparatus according to claim 7 wherein said first outlet receptacle means includes a first receptacle which is stationary and said first carrier liquid supply means is also stationary; and said second outlet receptacle means includes a second receptacle which is stationary and said second carrier liquid supply means is also stationary.

References Cited by the Examiner

UNITED STATES PATENTS

| 671,573 | 4/1901 | Wielgolaski | 233—15 |
| 876,642 | 1/1908 | Hearing et al. | 233—15 |
| 2,313,541 | 3/1943 | Flowers | 233—15 |
| 2,542,456 | 2/1951 | Ayres | 233—19 |
| 2,628,023 | 2/1953 | Dahlstedt | 233—19 |
| 3,196,449 | 7/1965 | Pelavin et al. | 346—34 |
| 3,211,530 | 10/1965 | Harvey | 23—253 |

M. CARY NELSON, *Primary Examiner.*

HENRY T. KLINKSIEK, *Examiner.*